United States Patent [19]

Steiner

[11] Patent Number: 4,978,064
[45] Date of Patent: Dec. 18, 1990

[54] SYSTEM AND METHOD OF HEAT DISTRIBUTION IN ENGINE POWERED CRAFT

[75] Inventor: Norman F. Steiner, Longmont, Colo.

[73] Assignee: Air Comm Corporation, Boulder, Colo.

[21] Appl. No.: 291,495

[22] Filed: Dec. 29, 1988

[51] Int. Cl.$^5$ .............................................. B60H 1/02
[52] U.S. Cl. .............................. 237/12.3 A; 98/2.09; 98/2.05
[58] Field of Search .................. 98/2.05, 2.01, 2.09; 237/12.3 A, 12.3 B, 2 A, 12.1; 62/401, 402

[56] References Cited

U.S. PATENT DOCUMENTS

| | | | |
|---|---|---|---|
| 2,737,874 | 3/1956 | Gallay et al. | 98/2.08 |
| 4,308,993 | 1/1982 | Buss | 237/2 A |
| 4,693,172 | 9/1987 | Harvey | 98/2.01 |

Primary Examiner—Henry A. Bennet
Attorney, Agent, or Firm—Harold A. Burdick

[57] ABSTRACT

A system and method for distribution of heated air in a selected area, for example the cabin of an engine powered craft such as a helicopter, is disclosed. The heat distribution system includes a main hot air supply conduit connected to the engine compressor of the engine for receipt therethrough of hot bleed air from the engine, a zone supply conduit having a plurality of outlets, a main control valve connected between the main supply conduit and the zone supply conduit for controlling the volume of hot air passing therethrough from the main supply conduit to the zone supply conduit, and a plurality of heated air distribution units for selectively controlling the volume of hot air released into the units through the zone supply conduit outlets and for mixing the hot air with air at ambient temperature received at the units for thus distributing heated air from the units to different zones in the selected area. In a helicopter, a portion of the mian supply conduit, the zone supply conduit, the main valve and the distribution units are located under the forward facing pilot and passenger seating units and in the center console dividing the seating units and are spaced from helicopter controls located thereat to thus enhance safety and accessibility of the system and system controls installed in the helicopter.

20 Claims, 3 Drawing Sheets

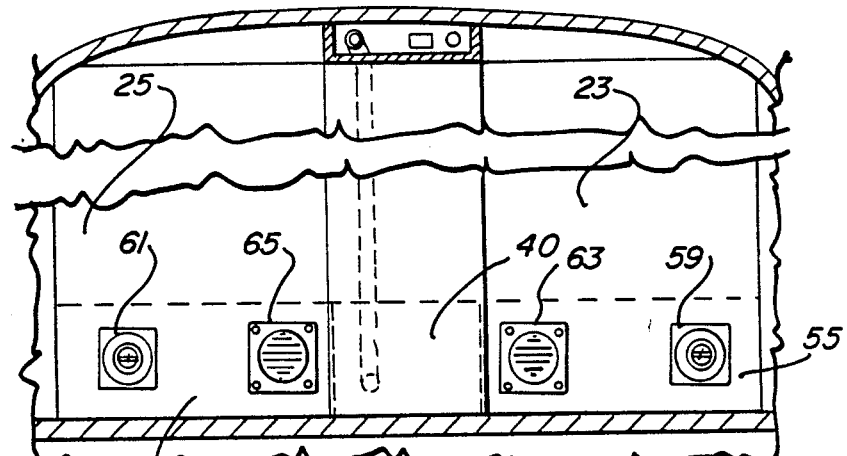
Fig_2
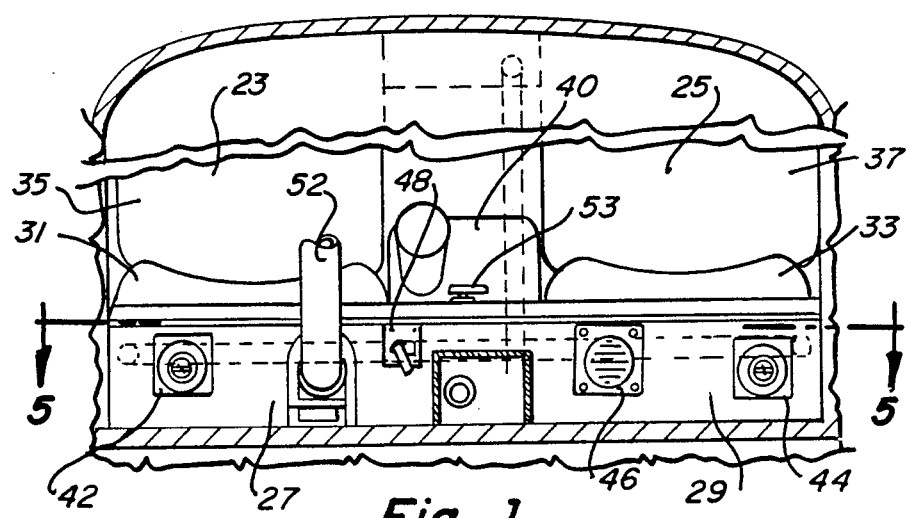
Fig_1
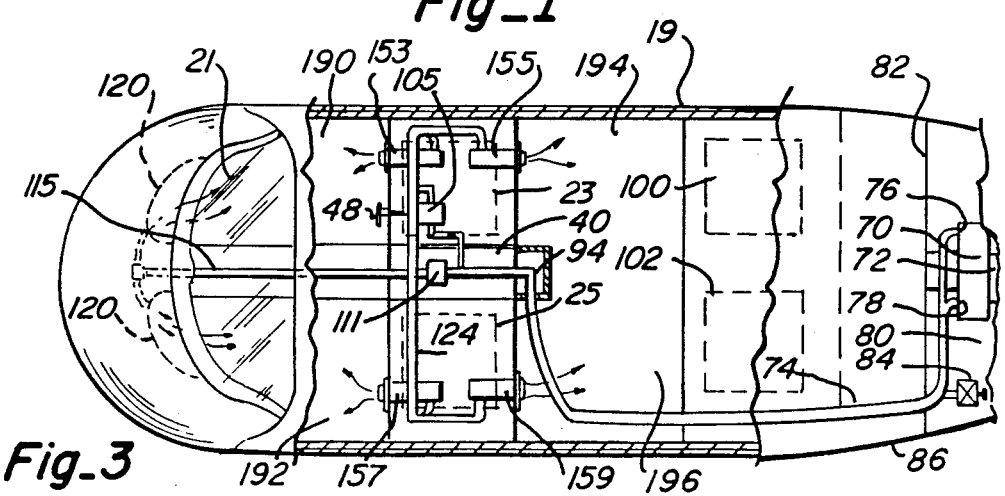
Fig_3

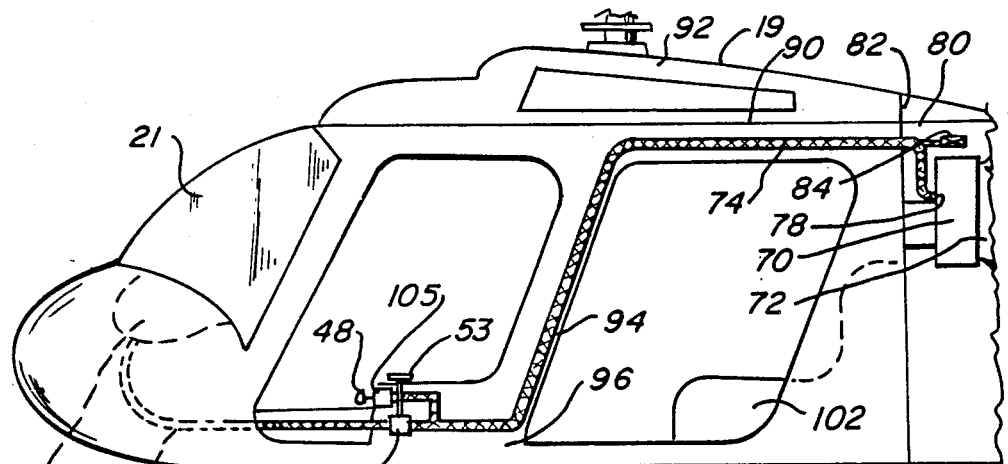
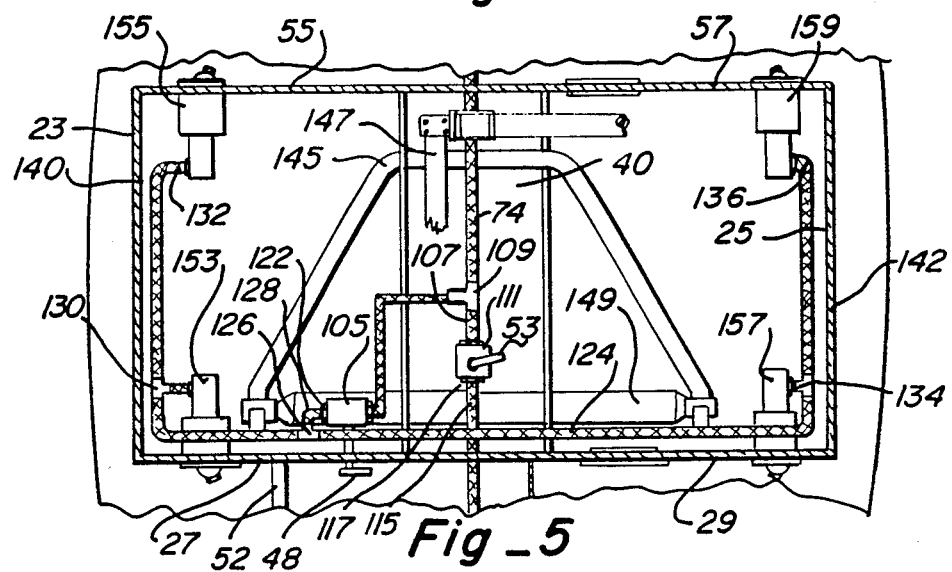
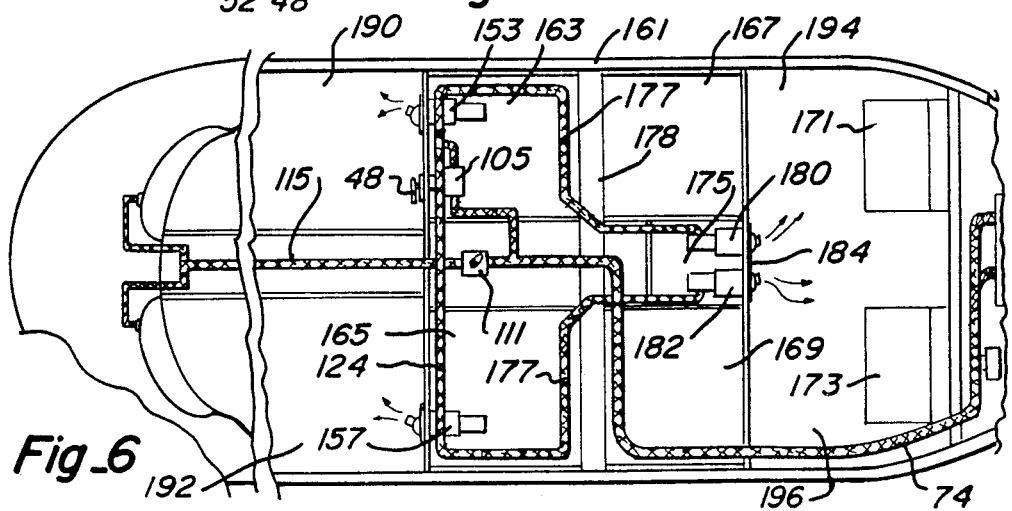

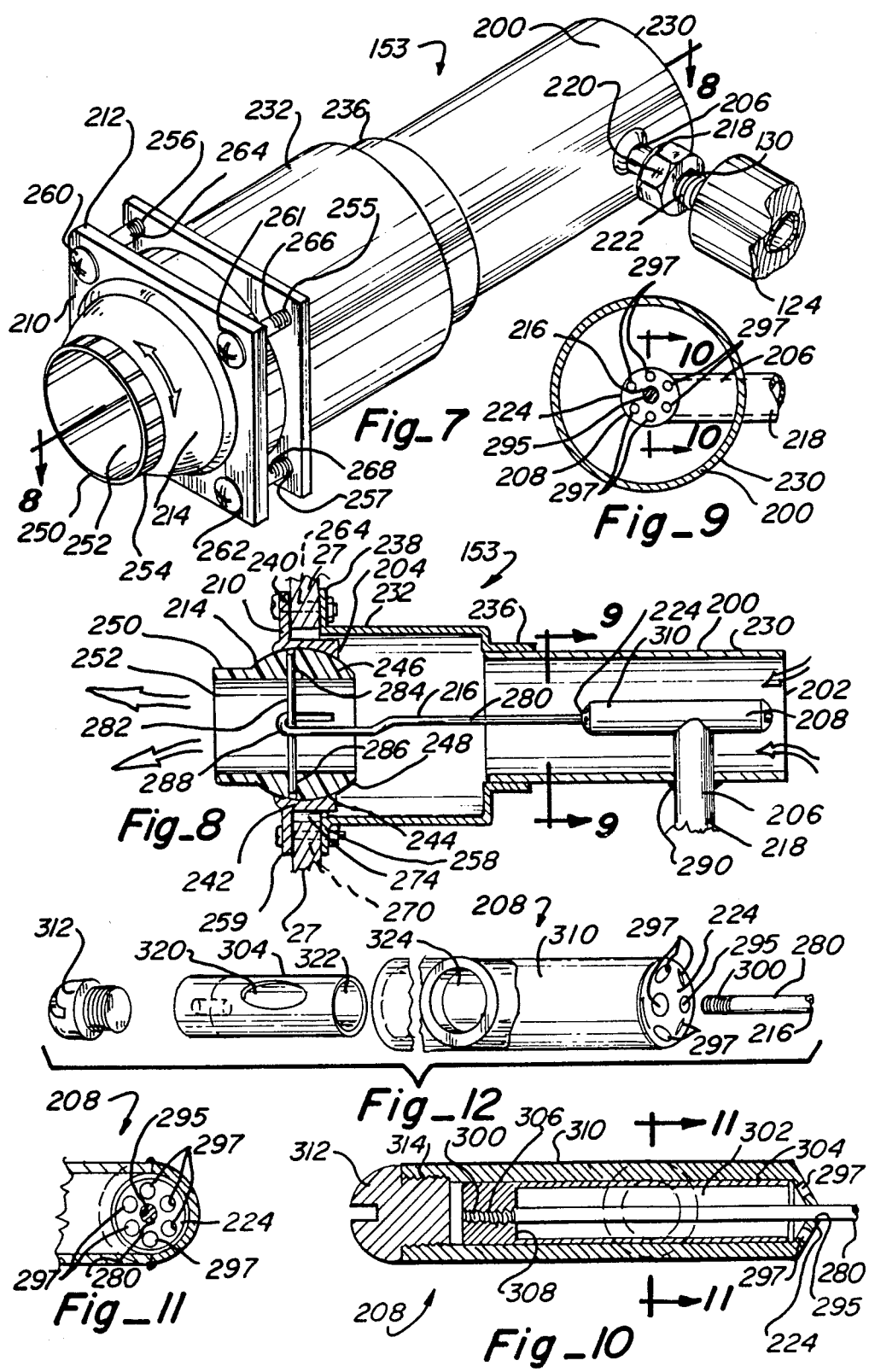

SYSTEM AND METHOD OF HEAT DISTRIBUTION IN ENGINE POWERED CRAFT

FIELD OF THE INVENTION

This invention relates to a system and method for distributing heated fluid in a selected area, and, more particularly, relates to a system and method for selective distribution of heated air in the cabin of an engine powered craft.

BACKGROUND OF THE INVENTION

Cabin heating systems and methods for distribution of heated air in an engine powered craft, such as a helicopter, utilizing hot bleed air from the craft's engine have been heretofore known and/or utilized (see for example U.S. Pat. No. 4,308,993). Such systems heretofore known, however, have not proven totally effective and efficient, for example having not heretofore provided both main valving and zone valving for selective control of the volume of flow of hot bleed air and heated air into different zones of the craft, convenient location of valve control mechanisms, and hot air conduit routing within the craft which is easily installable and which maintains adequate clearance from movable craft control members, for example the control mechanisms located beneath the pilot and passenger seats in a four or six seat helicopter. Further improvement in such systems and methods could thus still be utilized.

SUMMARY OF THE INVENTION

This invention provides a system and method for selective distribution of heated fluid, such as air, in a selected area, for example the cabin of a helicopter. The system includes a main hot air supply conduit connected at one end thereof with a source of hot air, for example hot bleed air from a helicopter engine compressor, and connected at the other end thereof to a main control valve for controlling the volume of hot air passing through the main valve.

A zone supply conduit having a plurality of outlets is connected to the main valve, and units for distribution of heated fluid into different zones in the selected area are connected to each of the zone supply conduit outlets. Each of the units include valving for conduct of a selected volume of hot air therethrough having an outlet terminal positioned in a fluid collection structure, for example a conduit, between an inlet port and outlet port thereof, the inlet port receiving air at ambient temperature therethrough and the outlet port opening to the selected area for distribution of heated air into the selected area.

An actuating member is mounted adjacent to the outlet port of the conduit and is connected with the unit valving for providing selectable actuation of, and control of the volume of, hot air flow through the valve and into the conduit for mixing thereof with air at an ambient temperature to provide heated air for distribution into the selected area. The units preferably include a directing member, for example a swivelable portion having a passageway therein mounted adjacent to the outlet port of the conduit, for control of the direction of heated air distribution therefrom into the selected area.

When utilized to heat the cabin of a helicopter, the conduits and valves are at least partially located beneath the forward facing pilot and passenger seats and in the console separating the seats and are positioned thereunder spaced from helicopter control members which are also located under the seat thus providing for ease of installation and maintaining adequate clearance from such control members. Valve control mechanisms are located for ready accessibility thereof to the pilot and passengers of the craft.

It is therefore an object of this invention to provide an improved system and method for selective distribution of heated fluid in a selected area.

It is another object of this invention to provide an improved system and method for selective distribution of heated fluid in a selected area for application in the cabin of a helicopter.

It is still another object of this invention to provide an improved system and method for selective distribution of heated fluid in a helicopter cabin utilizing engine bleed air.

It is yet another object of this invention to provide an improved system and method for selective distribution of heated fluid having both a main valving control and zone valving controls for controlling the volume of flow of hot bleed air within the system to different zones in the cabin of a helicopter.

It is yet another object of this invention to provide an improved system for selective distribution of heated fluid in a helicopter cabin which includes a main supply conduit and a zone supply conduit, with the conduits being located beneath the forward facing pilot and passenger seating units and in the center console dividing the seating units, with adequate clearance from helicopter control members located beneath the seating units being maintained.

It is another object of this invention to provide an improved system for selective distribution of heated fluid in a helicopter cabin wherein a main valving control mechanism is positioned to be easily accessible to a pilot of the helicopter, and wherein zone valving control mechanisms are located to be easily accessible to occupants of various zones in the helicopter.

It is still another object of this invention to provide a unit for distribution of heated air into a selected area wherein hot bleed air is released through a valve and into a fluid collection structure having inlet and outlet ports by manipulation of an actuating member positioned adjacent to the outlet port of the fluid collection structure.

It is still another object of this invention to provide a unit for distribution of heated fluid into a selected area wherein both the direction and volume of heated air flowing through the unit and into the selected area are controlled.

It is yet another object of this invention to provide a unit for distribution of heated fluid into a selected area which includes valving having an inlet connected to a hot air source and an outlet positioned between the inlet port and outlet port of a fluid collection structure, with the inlet port thereof receiving air at ambient temperature therethrough and the outlet port opening to the selected area for distribution of heated air into the selected area, and wherein an actuating member is mounted adjacent to the outlet port of the fluid collection structure and connected with a flow control mechanism in the valving for providing selectable actuation of, and control over the volume of, hot air flow through the valving and into the collection structure for mixing thereof with air at an ambient temperature and for distribution of heated air from the unit through the outlet port of the collection structure to the selected area.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a front view of the pilot seat, passenger seat and center console of a helicopter cabin illustrating location of heated air distribution units and valving control mechanisms of this invention;

FIG. 2 is a rear view of the seating units and center console shown in FIG. 1 illustrating positioning of heat distribution units of this system located thereat;

FIG. 3 is a top schematic view of conduit routing of the cabin heat distribution system of this invention in a four seat helicopter.

FIG. 4 is a side schematic view of the conduit routing illustrated in FIG. 3;

FIG. 5 is a sectional view taken along section lines 5—5 of FIG. 1 illustrating the positioning of the main and zone supply conduits, valving, and valving control mechanisms of this invention beneath the seating units;

FIG. 6 is a top schematic view of conduit routing and valving and outlet placement in a six seat helicopter;

FIG. 7 is a perspective view of the unit for distribution of heated fluid of this invention;

FIG. 8 is a sectional view of the unit for distribution of heated fluid of FIG. 7 taken along section lines 8—8 thereof;

FIG. 9 is a sectional view of the unit of FIG. 7 taken along section lines 9—9 of FIG. 8;

FIG. 10 is a sectional view of the fluid flow control member of the unit shown in FIG. 8 taken along section lines 10—10 of FIG. 9;

FIG. 11 is a sectional view of the fluid flow control member taken along section lines 11—11 of FIG. 10; and FIG. 12 is an exploded view of the fluid flow control member of the unit shown in FIG. 8.

DESCRIPTION OF THE INVENTION

FIGS. 1 through 5 illustrate a system in accordance with this invention installed in a four seat helicopter 19. FIG. 1 illustrates the interior of the helicopter looking rearward in the helicopter from the windscreen, or windshield, 21 thereof (as shown in FIG. 3). The interior includes a pilot seat 23, passenger seat 25, each having forward seat frame members 27 and 29, respectively, upon which seating units 31 and 33 are in part maintained, units 31 and 33 having backrests 35 and 37 associated therewith. Between seats 23 and 25 is located center console 40.

Front frame members 27 and 29 have mounted therein heat distribution unit front portions 42 and 44, respectively, return air grill 46, main valve control mechanism 48, and helicopter steering control mechanism 52. Defrost system control mechanism 53 is located on center console 40. Main heater valve control mechanism (as well as the main valve hereinafter described) may be, for example, the control mechanism portion of the heater valve produced by Dixon Valve and Coupling Company (Part Numbers SSLBV-50 or SSBV-50).

FIG. 2 illustrates seating units 23 and 25 and center console 40 from the reverse side (viewing the seating units from the rear of the helicopter), and includes rear frame members 55 and 57, respectively, having heat distribution unit front portions 59 and 61 and return air units 63 and 65 mounted thereat. All the return air units 46, 63 and 65 can be grill type units mounted over openings in their respective frame members, for example utilizing screws or the like.

FIGS. 3 and 4 are schematic views of the hot air supply conduit routing for supplying hot bleed air from engine compressor 70 of helicopter 19 located at engine 72 thereof. Main hot air supply conduit 74 is connected to compressor 70 at outlets 76 and 78 thereof utilizing, for example, restricters such as those manufactured by Air Comm Corp. (Part Number S-9216EC-1) or similar units by Bell Helicopter Textron Inc., for supplying hot bleed air under pressure to main supply conduit 74.

Hot bleed air from a typical helicopter engine, for example from engines found in the Bell Helicopter Textron Inc. Helicopter Models 206A or B (four seat helicopters) or 206L, L-1 or L-3 (six seat helicopters), at the compressor stage of the engine has a temperature ranging between 350° F. and 650° F. Sizing of the outlets and restricters are calculated to limit the absolute volume of air to be removed from the engine compressor to preclude excessive power loss. Typical bleed air pressures at the compressor stage range from approximately 125 to 150 pounds per square inch and thus provides pressure in a similar range at main supply conduit 74 and thus throughout the system. Main supply conduit 74 is constructed, for example, of flexible stainless steel hose, stainless steel tubing, or a combination thereof. The stainless steel tubing, for example, has a one-half inch outside diameter and a 0.035 inch wall.

Main supply conduit 74 is positioned in engine compartment 80 adjacent to fire wall 82 and includes drain valve 84 positioned adjacent to fire wall 82 and helicopter side wall 86. Main supply conduit 74 is then received forwardly of fire wall 82 along side wall 86 and adjacent to cabin top 90 below transmission cowling 92, extending to flight control column 94 wherein main supply conduit 74 is received and directed to the floor area 96 of helicopter 19.

At floor area 96, main supply conduit 74 as directed forwardly through console 40 between seats 23 and 25.

Helicopter 19, as shown in FIGS. 3 and 4, is a four seat helicopter which also includes rear seats 100 and 102 therein. FIG. 5 illustrates conduit routing in console 40 of helicopter 19 and beneath seating units 23 and 25. Main supply line 74 is directed through the side wall of console 40 to the area beneath seat unit 23 and adjacent to console 40 to a position adjacent to forward frame member 27 thereof and to valve 105 attached to forward frame member 27. Valve 105 includes valve control mechanism 48 positioned through forward frame member 27, for example in an existing cutout of frame member 27 in the Bell 206 Helicopter referred to herein.

Defrosting or defogging system supply conduit 107 is attached to outlet 109 of main supply conduit 74 at one end thereof, and at the other end thereof to a conventional flow control valve 111 having control mechanism 53 associated therewith and positioned outwardly from the upper portion of center console 40 (as shown in FIG. 1). Defrost system control valve 111 has defrost line 115 connected at outlet 117 thereof for supplying hot bleed air through line 115 to air distribution member 120 located adjacent windshield 21 of helicopter 19 (as shown in FIGS. 3 and 4).

Outlet 122 of main control valve 105 has zone supply conduit 124 connected therewith utilizing, for example, tee-fitting 126 and linking conduit 128. Zone conduit 124 may be constructed of one-half inch outside diameter aluminum tubing having a 0.035 inch wall. Zone supply conduit 124 has a plurality of outlets 130, 132, 134 and 136 therefrom, and the conduit is positioned adjacent to the interior surfaces of front frame members 27 and 29, and side frame members 140 and 142. By thus routing main supply conduit 74 and zone supply conduit 124, and by thus positioning valves 105 and 111, ample clearance from helicopter control mechanisms 145, 147, 149 and 52 is provided thus enhancing ease of installation of the system and safety of the system where such movable control members are present. All of the conduits thus far illustrated may be wrapped in heat resistant material to provide additional safety against overheating adjacent combustible materials and the like.

Outlets 130, 132, 134 and 136 from zone supply conduit 124 are attaChed to heated air distribution units 153, 155, 157 and 159, respectively, for distribution thereinto of hot bleed air selectively passed through valve 105 at a pressure of between 125 and 150 pounds per square inch. Attachment to units 153, 155, 157 and 159 may be accomplished by conventional means, for example pressure fittings, compression fittings, and other known attachment mechanisms.

FIG. 6 illustrates a second embodiment of the system of this invention, which is similar in a great many regards to the system described hereinabove, substantially differing only in under seat conduit routing and distribution unit placement for use in six seat helicopter 161 having pilot seat 163 and passenger seats 165, 167, 169, 171 and 173 and having an elongated center console 175 extending between seats 163 and 165 and between seats 167 and 169.

As may be appreciated, zone supply conduit rearward sections 177, instead of attachment to heated air distribution units adjacent the rear frame members of the forward facing seats as illustrated hereinabove, extends back into center console 175 adjacent to seat dividing frame member 178, and then rearwardly therein to heated air distribution units 180 and 182 positioned in rearward facing frame member 184 of console 175. In this fashion, the adjustable air distribution units in the rear of the craft are accessible to passengers sitting in any of the seats 169 and 173 (with respect to air distribution unit 182) and 167 and 171 (with respect to air distribution unit 180).

As may be appreciated with respect to either of helicopters 19 or 161, this system is designed to provide incremental control of the volume of flow of heated bleed air through valve 105 utilizing control mechanism 48 thereof to the entire system, while providing further incremental volume flow control as well as directional control at the various distribution units (153, 155, 157 and 159 or 180 and 182) to zones 190, 192, 194 and 196 for further providing additional comfort to the pilot and passengers. In addition, distribution unit controls, as more fully set forth hereinafter, are all conveniently accessible to those occupying the various zones, while control mechanism 48 of main valve 105 is easily accessible to the pilot of the helicopter seated in seat 23 thus enabling the pilot to control the flow of hot bleed air to the system while yet maintaining full control of the craft with little or no distraction.

FIGS. 7 through 12 show heat distribution units 153, 155, 157, 159, 180 and 182 (utilizing, for example, unit 153 for purposes of illustration). Unit 153 as shown in FIGS. 7 and 8 includes fluid collection conduit 200 having inlet port 202 and outlet port 204, valving 206 including ejector 208, air outlet directing portion 210 including mounting portion 212 and movable portion 214 and valve actuating assembly 216. Directing portion 210 may be, for example, a hand adjustable, swivelable air directing outlet (for example an ES72182-2 air outlet as produced by ACD Corporation of Brian, Texas).

Valving 206 includes inlet terminal 218 (having for example threadable attachment 220 thereat securable to matable threads 222 at outlet 130 of zone supply conduit 124) and outlet terminal 224 at the end portion of ejector 208. Conduit 200 includes rear portion 230 adjacent to inlet port 202 and forward portion 232 adjacent to outlet port 204. Rearward portion 230 is preferably an aluminum tubing having a 1¾ inch inside diameter, and is slidably receivable in collar 236 of forward portion 232.

Forward portion 232 is preferably constructed of a plastic material, for example a Lexan plastic, and has mounting collar 238 adjacent to outlet port 204 thereof. Mounting portion 212 of directing portion 210 includes mounting collar 240 and receiving portion 242, the receiving portion having an arcuate annular inner surface 244 for receipt therein of body 246 of movable portion 214, body 246 having a matable arcuate outer annular surface 248 swivelably receivable within receiving portion 242 to allow substantially universal motion thereof in receiving portion 242. It should be appreciated that while air directing portion 210 is preferably a swivelable air output directing mechanism, louvered systems and other systems known to those skilled in the art could also be utilized.

Movable portion 214 also includes outer, hand manipulable portion 250 defining the outer terminus of passageway 252 through movable portion 214, and includes ribbed gripping portion 254 thereat. Mounting collars 238 and 240 include mating apertures 255, 256, 257, 258, 259, 260, 261 and 262 therein for receipt therethrough of mounting fasteners 264, 266, 268 and 270 (which may, for example, be machine screws and nuts). Matching apertures are provided adjacent to opening 274 in front frame member 27 for receipt therethrough of the fasteners to thereby attach unit 153 including portion 210 thereof to the frame member (it being understood that attachment of the various units shown herein to the various frame members herein is substantially similar to that described heretofore).

Actuating assembly 216 includes actuating rod 280 and linkage rod 282, with linkage rod 282 being affixed in body 246 of directing portion 210 in apertures 284 and 286 and across passageway 252. Actuating rod 280 includes hook portion 288 movably receivable over linkage rod 282 for allowing rotational motion to be imparted to actuating rod 216 by rotation of movable portion 214 of direction portion 210 while yet allowing universal movement of movable portion 214 in receiving portion 242. Actuating rod 280 is receivable at ejector 208 of valving 206.

Inlet terminus 218 of valve 206 is received through rearward portion 230 of conduit 200 at aperture 290 thereof, and is preferably affixed thereat by, for example, welding.

Turning now to FIGS. 9 through 12, ejector portion 208 of valving 206 is illustrated. Outlet terminus 224 includes central aperture 295 thereat for receipt therethrough of actuating rod 280 and a plurality of outlet ports 297. Outlet ports 297 are angularly oriented in outlet terminus 224 and are oriented for output of hot bleed air therethrough having a directional component toward outlet port 204 of conduit 200, with the angular orientation thereof, as shown in FIG. 10, being approximately 23° from the horizontal.

Actuating rod 216 includes threaded portion 300 receivable through aperture 295 and through passageway 302 of rotatable fluid flow control valve 304 to matable receiving portion 306 at the rear wall 308 of fluid flow control valve 304. Outer ejector shell 310 houses control valve 304 therein and has a threadable rear portion 312 threadable into rear opening 314 thereof. In this fashion, valve 304 may be rotated in outer shell 310 by rotation of actuating rod 280.

As shown in FIG. 12, flow control valve 304 includes aperture 320 and outlet port 322 therein, with aperture 320 having a position within outer shell 310 when valve 304 is mounted therein corresponding to inlet port 324 of inlet terminus 218 in outer shell 310. As may be appreciated, upon rotation of control valve 304 within outer shell 310, aperture 320 may be brought into registry with port 324, either fully or partially, or taken out of registry with port 324 by rotation of actuating rod 216 thus controlling the volume of flow of hot bleed air through valving 206.

In operation (utilizing the system shown in FIGS. 1 through 5 for example), hot bleed air from compressor 70 of engine 72 is delivered under pressure into main supply conduit 74 and to valves 105 and 111. If valve 111 is open, hot air is delivered to defrost air distribution member 120 at windshield 21 of helicopter 19. If valve 105 is open, either fully or partially, a selected volume of hot bleed air is introduced into zone supply conduit 124 for presentation of the selected volume of hot bleed air at outlets 130, 132, 134 and 136 thereof.

Upon rotation of movable portion 214 directing portion 210, and thus actuating rod 280, of any of the distribution units 153, 155, 157, or 159 (or 180 or 182), a selected volume of hot bleed air is introduced into conduit 200 through the plurality of outlet ports 297 at terminus 224 at a position spaced from the position of passageway 252, the hot bleed air being introduced thereinto under pressure (between 125 and 150 psi), and at an angle directed toward outlet 204 of conduit 200. Movement of hot bleed air into conduit 200 draws air at ambient temperature in the helicopter cabin through inlet port 202 of conduit 200 for mixing thereof with the hot bleed air, and the flow of the combined, heated air is directed to outlet port 204 of conduit 200 thereby, and through passageway 252 into the selected area, or zone thereof.

The direction of flow of heated air through passageway 252 may be adjusted by movement of movable portion 214 thus causing swiveling of movable portion 214 in mounting portion 212 thereby allowing an occupant of a particular zone to control the direction of the flow into the occupant's zone.

As may be appreciated from the foregoing, an improved system and method for distribution of heated air into a selected area such as the cabin of an engine powered craft is provided hereby. The heat distribution system includes a main hot air supply conduit connected to an engine compressor of an engine for receipt therethrough of hot bleed air from the engine, a zone supply conduit having a plurality of outlets therefrom, a main control valve connected between the main supply conduit and the zone supply conduit for controlling the volume of hot air passing therethrough from the main supply conduit to the zone supply conduit, and a plurality of lightweight yet heat tolerant air distribution units for selectively controlling the volume of hot air released into the units through the zone supply conduit outlets and for mixing the hot air with air at ambient temperature to thus distribute heated air from the units to different zones in the selected area. When utilized as a helicopter cabin heating system, The system is located in the selected area to enhance safety of the system, and valve control mechanisms are positioned to be conveniently accessible to occupants of the cabin and of the particular zones therein.

What is claimed is:

1. A unit for selective distribution of heated fluid in a selected area, said fluid being heated by mixing of hot fluid supplied under pressure from a hot fluid source with fluid at ambient temperature from the selected area in said unit, said unit comprising:

valving means for selective conduct of said hot fluid therethrough and including an inlet terminal connected with said hot fluid source, at least a first outlet terminal, and fluid flow control means for controlling flow of said hot fluid through said outlet terminal;

fluid collecting means having at least said outlet terminal of said valving means positioned therein, said fluid collecting means including an inlet port for receipt therethrough of said fluid at ambient temperature from said selected area and an outlet port for distribution of said heated fluid to said selected area therethrough, said outlet terminal of said valving means being positioned between said ports and oriented so that hot fluid under pressure is directed into said fluid collecting means in a direction having a component toward said outlet port to thereby induce movement of said fluid at ambient temperature into said inlet port; and actuating means mounted adjacent to said outlet port of said fluid collecting means and connected with said fluid flow control means of said valving means for selectively actuating said fluid flow control means so that said hot fluid is conducted through said outlet terminal of said valving means into said fluid collecting means to thus mix said hot fluid and said fluid at ambient temperature in said fluid collecting means thereby providing said heated fluid for distribution through said outlet port of said fluid collecting means to said selected area.

2. The unit of claim 1 wherein said valving means includes ejector means and wherein said at least first outlet terminal includes a plurality of outlet terminals radially arranged at said ejector means so that said hot fluid is ejected into said fluid collecting means in said direction having a component toward said outlet port to thereby cause mixing of said hot fluid with said fluid at ambient temperature in said fluid collecting means while also inducing movement of fluid through said fluid collecting means and said ports thereof.

3. The unit of claim 1 wherein said hot fluid is at a temperature of between 350° F. and 650° F., wherein said fluid collecting means includes a rearward portion and a forward portion, said rearward portion being adjacent to said inlet port thereof and having said valving means attached thereto and said outlet terminal of said valving means positioned therein, and said forward portion being adjacent to said outlet port, and wherein at least said valving means and said rearward portion of said fluid collecting means are made of heat tolerant material.

4. The unit of claim 3 wherein said forward portion of said fluid collecting means is made of plastic material.

5. The unit of claim 1 wherein said actuating means includes a hand manipulable rotatable portion having an actuating rod connected therewith at a first end of said rod, said rod having a second end connected to said fluid flow control means of said valving means, rotation of said rotatable portion causing corresponding rotation of said actuating rod and said fluid flow control means for selective conduct of said hot fluid through said valving means into said fluid collecting means thereby.

6. The unit of claim 5 further comprising mounting means mounted adjacent to said outlet port of said fluid collecting means, and wherein said rotatable portion of said actuating means is swivably mounted in said mounting means and includes a passageway therethrough communicating with said outlet port of said conduit means, said rotatable portion being manually adjustable so that said passageway causes said heated fluid to be distributed into said selected area in selected directions.

7. A unit for selective distribution of heated air in a selected area, said air being heated by mixing of a selected volume of hot air supplied under pressure from a hot air source with air at ambient temperature from said selected area in said unit, said unit comprising:
   valving means for selective conduct of said hot air therethrough and including an inlet terminal connected with said hot air source, at least a first outlet terminal and fluid flow control means positioned between said inlet and outlet terminals for controlling the volume of said hot air flowing through said valving means;
   conduit means having at least said outlet terminal and said fluid flow control means of said valving means positioned therein, said conduit means including an inlet port for receipt therethrough of said air at ambient temperature from said selected area and an outlet port for distribution of said heated air to said selected area therethrough, said outlet terminal of said valving means being positioned between said ports and oriented so that when hot air is conducted into said conduit means through said valving means said hot air is moving in a direction having a component toward said outlet port of said conduit means;
   directing means having a mounting portion mounted adjacent to said outlet port of said conduit means and a hand movable portion movable in said mounting portion for selectively directing said heated air into said selected area; and
   actuating means connected with said movable portion of said directing means and with said fluid flow control means of said valving means for selectively actuating said fluid flow control means so that a selected volume of said hot air is conducted through said outlet terminal of said valving means into said conduit means to thus mix said hot air and said air at ambient temperature in said conduit means and so that said heated air is distributed through said outlet port of said conduit means to said selected area.

8. The unit of claim 7 wherein said hand movable portion of said directing means includes an outer portion having a passageway defined therethrough opening at a first end thereof to said outlet port of said conduit means and at a second end thereof to said selected area so that the direction of heated air flow into said selected area is controlled by movement of said movable portion.

9. The unit of claim 8 wherein said movable portion of said directing means is swivably mounted in said mounting portion for accommodating substantially universal motion of said movable portion in said mounting portion, and wherein said actuating means includes linkage means connected to said outer portion of said movable portion of said directing means and an actuating rod connected between said linkage means and said fluid flow control means so that by rotation of said movable portion corresponding rotation of said actuating rod actuates said fluid flow control means.

10. The unit of claim 7 wherein said unit is for use in a heating system including a plurality of such units for selective control of heating in different zones of said selected area, and wherein said units are light weight and yet tolerant of temperatures of said hot air ranging between 350° F. and 650° F.

11. A system for distributing heated air in the cabin of a helicopter having an engine, at least a forward facing pilot seat and first passenger seat and a center console dividing said seats, said seats having front, rear and outer side frame members for supporting seating units thereon and for housing helicopter control members therebetween beneath said seating units, said frame members having inner and outer facing surfaces, said system comprising:
   a main hot air supply conduit connected at one end thereof with said engine for receipt therethrough of hot bleed air from said engine and having a second end, said main hot air supply conduit being receivable adjacent to said center console and adjacent to said inner facing surface of said front frame member of one of said pilot seat and said passenger seat beneath said seating units;
   main valving means positioned adjacent to said inner facing surface of said front frame member of one of said pilot seat and said passenger seat beneath said seating units, said main valving means having inlet and outlet ports, said inlet port being connected to said second end of said main hot air supply conduit, and having a control mechanism for opening and closing said main valving means, said control mechanism positioned adjacent to said outer facing surface of said front frame member of one of said pilot seat and said passenger seat; and
   a zone supply conduit connected to said outlet port of said main valving means and having a plurality of outlets therefrom, said zone supply conduit being positioned adjacent to at least some of said inner facing surfaces of said front, rear and outer side frame members of said seats and spaced from said helicopter control members.

12. The system of claim 11 further comprising a plurality of distribution units positioned adjacent to at least said front frame members of said pilot and passenger seats and connected to different ones of said outlets of said zone supply conduit, each of said distribution units having an intake port for intake of air at ambient temperature from said cabin of said helicopter, an outlet port for distribution of heated air into said cabin of said helicopter and actuating means for controlling release of said hot bleed air from said zone supply conduit into said distribution unit for mixing thereof with said air at ambient temperature in said distribution unit and thereby controlling release of heated air through said outlet port of said distribution unit.

13. The system of claim 12 wherein said control mechanism of said main valving means incrementally controls the volume of hot bleed air flowing through said main valving means and wherein said actuating means of said distribution units incrementally control the volume of hot bleed air released into said distribution units.

14. The system of claim 11 wherein said helicopter has a windshield, wherein said main hot air supply conduit has a hot air outlet positioned between said one end and said second end thereof, and wherein said system further comprises windshield defrosting and defogging means connected with said hot air outlet of said main hot air supply conduit for selectively directing said hot bleed air to said windshield of said helicopter.

15. The system of claim 11 wherein said helicopter has at least second and third passenger seats positioned rearward in said helicopter of said pilot seat and said first passenger seat, and wherein different ones of said plurality of outlets from said zone supply conduit are positioned adjacent to each of said front frame members of said pilot seat and said first passenger seat and at least one of each of said rear frame members of said pilot seat and said first passenger seat and said center console.

16. A method for distributing heated air in the cabin of a helicopter having an engine and at least forward facing pilot seat and a first passenger seat, said method comprising:
    directing hot bleed air from said engine to a main valve;
    selectively directing said hot bleed air from said main valve to a plurality of distribution units each one of which is located in a different zone of said cabin of said helicopter;
    providing air at ambient temperature from said cabin at said plurality of distribution units;
    controlling the flow of said hot bleed air through said main valve to said plurality of distribution units from a position easily accessible from said pilot seat;
    individually controlling the flow of said hot bleed air into each one of said distribution units from positions easily accessible to occupants of said different zones to thus selectively introduce said hot bleed air into said distribution units; and
    mixing said hot bleed air and said air at ambient temperature in said distribution units for selective distribution of heated air therefrom to said different zones in said cabin of said helicopter.

17. The method of claim 16 wherein said helicopter includes a center console dividing said seats, said seats having front, rear and outer side frame members for supporting seating units thereon and for housing helicopter control members therebetween beneath said seating units, said frame members having inner and outer facing surfaces, and wherein the step of controlling the flow of said hot bleed air through said main valve includes the step of selectively controlling the volume of said hot bleed air directed from said main valve to said distribution units from a control mechanism positioned adjacent to said outer facing surface of said front frame member of said pilot seat.

18. The method of claim 17 wherein said different zones include a first zone forward in said helicopter cabin from said front frame member of said pilot seat, a second zone forward in said helicopter cabin from said front frame member of said first passenger seat, a third zone rearward in said helicopter cabin from said rear frame member of said pilot seat, and a fourth zone rearward in said helicopter cabin from said rear frame member of said first passenger seat, and wherein a selected volume of said hot bleed air is directed from said main valve to a distribution unit in each of said zones.

19. The method of claim 17 wherein the step of individually controlling the flow of said hot bleed air through each one of said distribution units includes the step of ejecting a selected volume of said hot bleed air into a conduit positioned in each of said distribution units having said air at ambient temperature directed thereto, wherein said hot bleed air is ejected from positions spaced from said positions in said different zones from which said heated air is selectively distributed, and wherein said positions easily accessible to occupants of said different zones are adjacent to said positions in said different zones.

20. The method of claim 16 including the step of individually controlling the direction of distribution of heated air in said different zones from said distribution units, and wherein the step of individually controlling the flow of said hot bleed air through each one of said distribution units includes the step of individually controlling the volume of flow of said hot bleed air into each one of said distribution units from positions easily accessible to occupants of said different zones.

* * * * *